(12) United States Patent
Botsa et al.

(10) Patent No.: US 12,332,832 B2
(45) Date of Patent: Jun. 17, 2025

(54) UNIVERSAL SERIAL BUS (USB) BACKPLANE

(71) Applicant: Schneider Electric Systems USA, Inc., Foxboro, MA (US)

(72) Inventors: Krishnamohan Botsa, Hyderabad (IN); Shahid Ansari, Hyderabad (IN)

(73) Assignee: Schneider Electric Systems USA, Inc., Foxborough, MA (US)

( * ) Notice: Subject to any disclaimer, the term of this patent is extended or adjusted under 35 U.S.C. 154(b) by 103 days.

(21) Appl. No.: 18/052,592

(22) Filed: Nov. 4, 2022

(65) Prior Publication Data

US 2024/0104047 A1    Mar. 28, 2024

(30) Foreign Application Priority Data

Sep. 22, 2022 (IN) .............................. 202211054326

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ................................................. G16H 40/63
See application file for complete search history.

(56) References Cited

U.S. PATENT DOCUMENTS

| 7,502,878 B1* | 3/2009 | Wright ................ G06F 13/4022 710/37 |
| 9,015,355 B2* | 4/2015 | Klughart ................ G06F 13/37 710/5 |
| 2003/0179532 A1* | 9/2003 | Goergen ................ H05K 1/024 361/118 |
| 2006/0059293 A1 | 3/2006 | Wurzburg et al. |
| 2016/0371213 A1* | 12/2016 | Voto .................... G06F 13/4045 |
| 2019/0146664 A1 | 5/2019 | Guynes et al. |

(Continued)

OTHER PUBLICATIONS

Universal Serial Bus Specification Revision 2.0, vol. Revision 2.0, Apr. 27, 2000, 650 pages.

(Continued)

*Primary Examiner* — Henry Tsai
*Assistant Examiner* — Juanito C Borromeo
(74) *Attorney, Agent, or Firm* — Stinson LLP (57) ABSTRACT

A high-speed scalable backplane enables communications between a central processing unit (CPU) module and field input/output (I/O) and/or communication modules. The backplane comprises a root hub associated with the CPU module. The backplane also includes a plurality of Universal Serial Bus (USB) hubs sequentially coupled to each other and arranged according to the tiered architecture. Each of the USB hubs has an upstream port and a plurality of downstream ports. A top USB hub has an upstream port coupled to a host port of the root hub. One or more lower USB hubs each have an upstream port coupled to a selected downstream port of one of the USB hubs in an immediately preceding tier of the tiered architecture. The lower USB hubs are each configured to enable a plurality of I/O and/or communications connections for the modules via a plurality of downstream ports.

22 Claims, 5 Drawing Sheets

(56) References Cited

U.S. PATENT DOCUMENTS

2022/0269630 A1    8/2022  Lee
2023/0409098 A1*  12/2023  Sivaramakrishnan ......................
                                                G06F 1/3253

OTHER PUBLICATIONS

Otto et al., USB 2.0—Die Theorie Funktioniert Schon Mite Der Offiziellen Spezifikation von USB 2.0 nimt einei idee knkrete gestalt an, vol. 49, No. 19, Sep. 19, 2000, 7 pages. No translation available.
Extended European Search Report from EP Application No. 22213002.3, dated Aug. 9, 2023, 7 pages.

\* cited by examiner

FIG. 5

UNIVERSAL SERIAL BUS (USB) BACKPLANE

BACKGROUND

Industrial automation and instrumentation solutions are predominantly backplane oriented. A backplane is a physical and electrical system bus that interconnects several printed circuit board assemblies (including field I/O boards and communication boards that support multiple protocols) and the like. These boards are connected through a series of connectors. Backplanes are preferably passive to avoid failures of the electronics and improve their reliability. They can be stand-alone or connected to other backplanes to form a larger system.

Conventional backplane technologies, such as ISA, VME, VXI, and PCI, are not easily scalable to support a greater number of field I/O and/or communication boards. There is a need for deterministic data updates (e.g., less than 1 millisecond) from the field devices to run control logic using, for example, IEC 61499. In a typical I/O server-type application, there is a need to bring thousands of hard wired I/O's in less than 30 milliseconds to run the control logic. Conventional backplanes, however, are unable to achieve the desired screw-to-screw turnaround times (e.g., less than 1 ms) in a cost-effective manner. In addition, conventional backplanes cannot scale to typical industrial operating temperatures due to their own heat generating components. If active components are used to achieve faster turnaround times, the reliability and cost of repair of conventional backplanes are negatively impacted. With conventional backplane technologies, infrastructure cost for every additional I/O module is typically doubled.

SUMMARY

Aspects of the present disclosure relate to a high-speed backplane capable of supporting large numbers of transactions (e.g., greater than 2000 transactions per second or 1000 I/O's all changing twice per second). Such a backplane is relatively low cost and commonly available in known processor architectures yet scalable, robust, and highly immune to noise.

In an aspect, a high-speed scalable backplane system enables communications between a central processing unit (CPU) module and one or more modules in an industrial system, including field input/output (I/O) and/or communication modules. The high-speed scalable backplane comprises a root hub associated with the CPU module that defines a first tier of a tiered architecture. The backplane also includes a plurality of Universal Serial Bus (USB) hubs sequentially coupled to each other and arranged according to the tiered architecture. Each of the USB hubs has an upstream port and a plurality of downstream ports. A top USB hub defines a second tier of the tiered architecture and has an upstream port coupled to a host port of the root hub. One or more lower USB hubs each define a successive tier of the tiered architecture. The lower USB hubs each have an upstream port coupled to a selected downstream port of one of the USB hubs in an immediately preceding tier of the tiered architecture. The lower USB hubs are each configured to enable a plurality of I/O and/or communications connections for the modules via a plurality of downstream ports. These connections are scalable as a function of a number of the modules using the high-speed scalable backplane in the industrial system.

In another aspect, a method of enabling high-speed scalable communications between a CPU module and one or more field I/O and/or communication modules includes installing a plurality of USB hubs in a backplane structure and coupling an upstream port of a top USB hub to a corresponding host port of a root hub associated with the CPU module. The root hub defines a first tier of a tiered architecture and the top USB hub defines a second tier of the tiered architecture. The method further includes coupling an upstream port of each of one or more lower USB hubs to a selected downstream port of one of the USB hubs in an immediately preceding tier of the tiered architecture. The lower USB hubs are each configured to enable a plurality of I/O and/or communications connections for the modules via a plurality of downstream ports and these connections are scalable as a function of a number of the modules using the high-speed scalable backplane in the industrial system.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
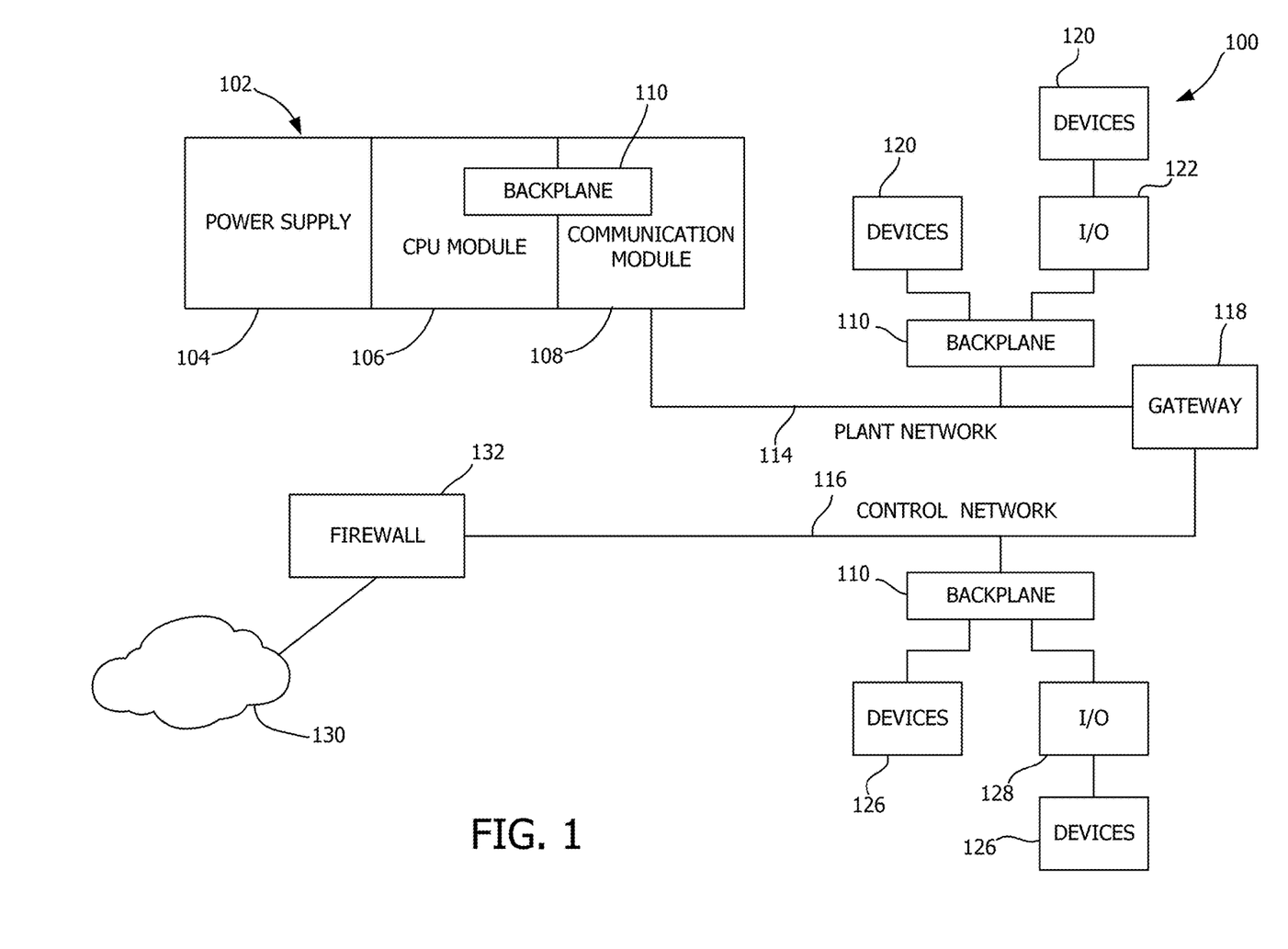
FIG. 1 illustrates an example automation system.

FIG. 1 shows an example control system 100 in which a controller 102 controls an automated process in an industrial environment. The controller 102 includes a power supply 104, a central processing unit (CPU) module 106, a communication module 108, and a backplane 110. In the controller, the backplane 110 provides communication between a special function module, such as the communication module 108, and the CPU module 106. The power supply 104 supplies electrical power to CPU module 106 and communication module 108 through backplane 110. Although illustrated separately in FIG. 1, it is to be understood that an I/O module may be part of the backplane 110.

The communication module 108 provides a communication interface between controller 102 and a plant network 114 and a control network 116 (via a gateway 118, or router or other connection device). The plant network 114 provides network connectivity via backplane 110 for plant devices 120, plant I/O 122, and the like, and is associated with the direct operation of automation by receiving output information and sending input information to controller 102. The control network 116 connects control devices 126, control I/O 128, and the like, which are typically responsible for monitoring, configuration, and supervisory controls. The control devices 126 or I/O 128 do not typically participate in the automation operations but instead monitor plant activities. Also, control network 116 connects to one or more remote networks, indicated as cloud 130, through a firewall 132.

As described above, the backplane 110 is a physical and electrical system bus for use in industrial, instrumentation, and automation systems that interconnects several printed circuit board assemblies, including field I/O boards and communication boards, through a series of connectors. According to an embodiment, backplane 110 is a high-speed scalable bus comprising a plurality of Universal Serial Bus (USB) connectors (see FIG. 2), wherein corresponding connectors received in the plurality of USB connections are capable of being securely coupled to the backplane 110. In a 7-tier architecture, for example, a maximum number of 127 devices can be communicated over USB (see FIG. 3). The backplane 110 comprising USB is capable of processing I/O faster while maintaining the requirements of backplane technology.

Figure 2:
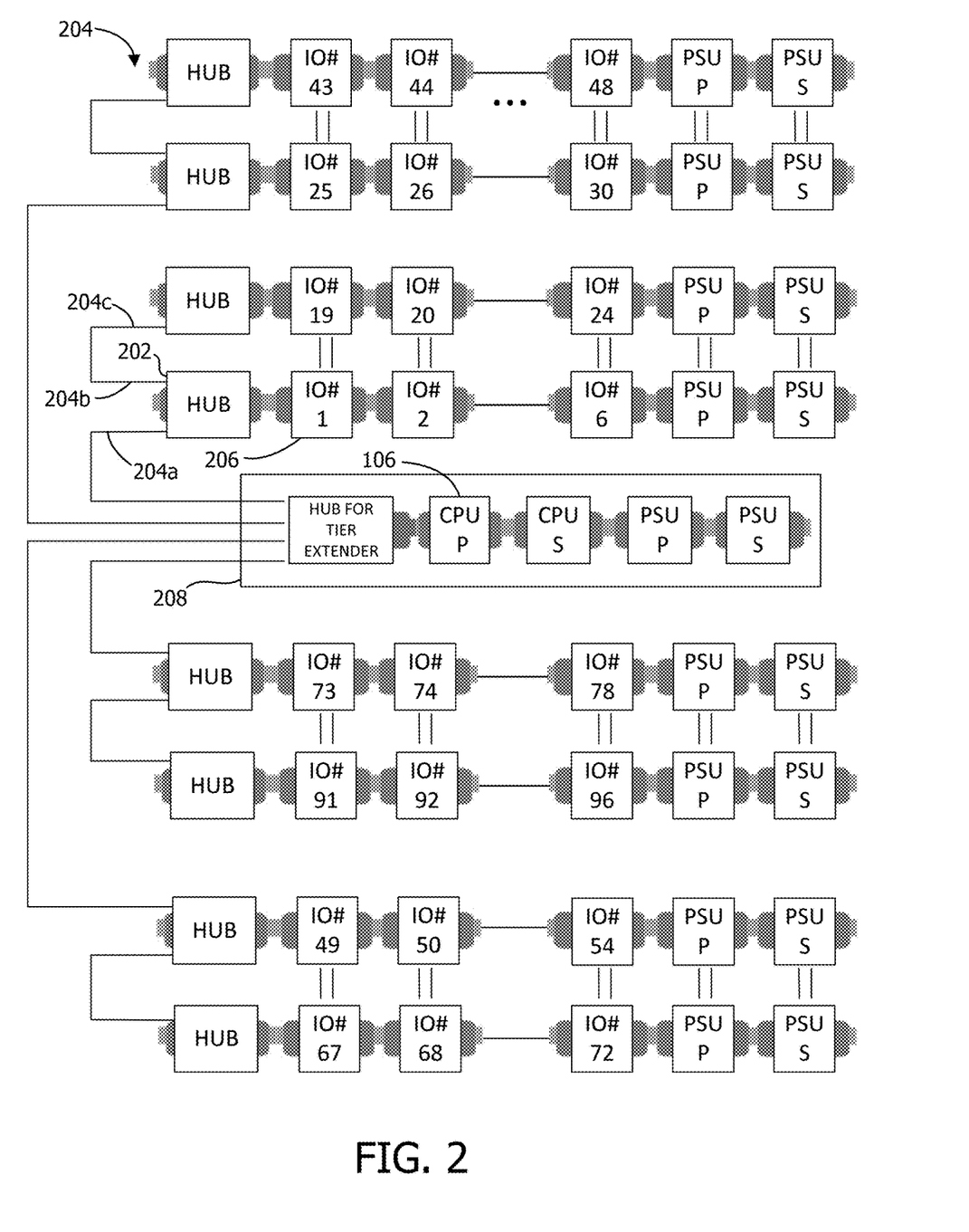
FIG. 2 is a block diagram of a system architecture of a backplane including Universal Serial Bus (USB) hubs according to an embodiment.

FIG. 2 illustrates an example system architecture for implementing backplane 110 using a high-speed USB for communication. The disclosed backplane system architecture comprises a plurality of USB hubs 202, each hub 202 having a plurality of ports 204. The backplane 110 utilizes USB as a means of interfacing CPU modules 106 with a plurality of field I/O and/or communication modules (e.g., devices and I/O 120, 122, 126, 128), indicated as I/O modules 206 in FIG. 2. The high-speed scalable backplane 110 manages communications between the CPU module 106 and the field I/O and/or communication modules 206 over the plurality of USB connections. No additional transceivers are required for this design. Moreover, because USB is a differential pair architecture, it eliminates common mode noise and works well in an industrial environment. It is to be understood that USB hubs 202 may be configured for standard USB, USB-C, micro-USB, USB 3.0, and next or later generation USB connections and can manage communication in any version of USB-supported standards, such as 1.0, 1.1, 2.0, 3.0, and 3.1, within the scope of the present disclosure.

In the illustrated embodiment, a USB tier architecture is used to scale backplane 110 enabling connection to 96 communication and/or I/O modules 206. An upstream port 204a of a first one of the hubs 202 connects to CPU module 106 via a USB host 208. In the embodiment of FIG. 2, each hub 202 has six downstream ports 204 that can be connected to a corresponding USB device port on the I/O modules 206. A selected downstream port 204b (e.g., the seventh downstream port) of the first hub 202 is used to connect to an upstream port 204c of a subsequent or successive one of the hubs 202 and so on. In other words, a selected downstream port of a first USB hub is coupled to an upstream port of a second USB hub, a selected downstream port of the second USB hub is coupled to an upstream port of a third USB hub, etc.

USB 2.0, for example, operates at a maximum data rate of 480 Mbps. This data rate satisfies deterministic data updates of 1 ms with 50% throughput consideration (80% of speed is guaranteed). USB manages its bus time in frames, wherein each frame represents 1 millisecond. The high-speed mode USB 2.0 manages its bus time in micro frames, wherein each micro frame represents 125 microseconds. In controlling transfers, a USB host controller uses frames or micro frames for time management. While executing the bidirectional data transfers, one write transaction occurs in one micro frame and one read transaction occurs in the next micro frame. In this manner, a minimum of 125 microseconds of delay is added to the scan time for a single device. For this reason, the scan time for one write and one read to a device is 163 microseconds. When two I/O modules 206 are connected to the host through USB hubs 202, the scan time for writing to two devices and reading from two devices is measured in range of 230-250 microseconds (two writes occur in one micro frame and two reads occur in a second micro frame). But the total scan time depends on the number of transactions that can occur in one micro frame as the number of devices connected to the host increases. For instance, if five transactions occur in one micro frame with data payload/packet size of 512 bytes, the total scan time as per hub architecture is: 3200 microseconds (3.2 msec) for 64 I/O modules; 3600 microseconds (3.6 msec) for 72 I/O modules; and 4800 microseconds (4.8 msec) for 96 I/O modules.

Figure 3:
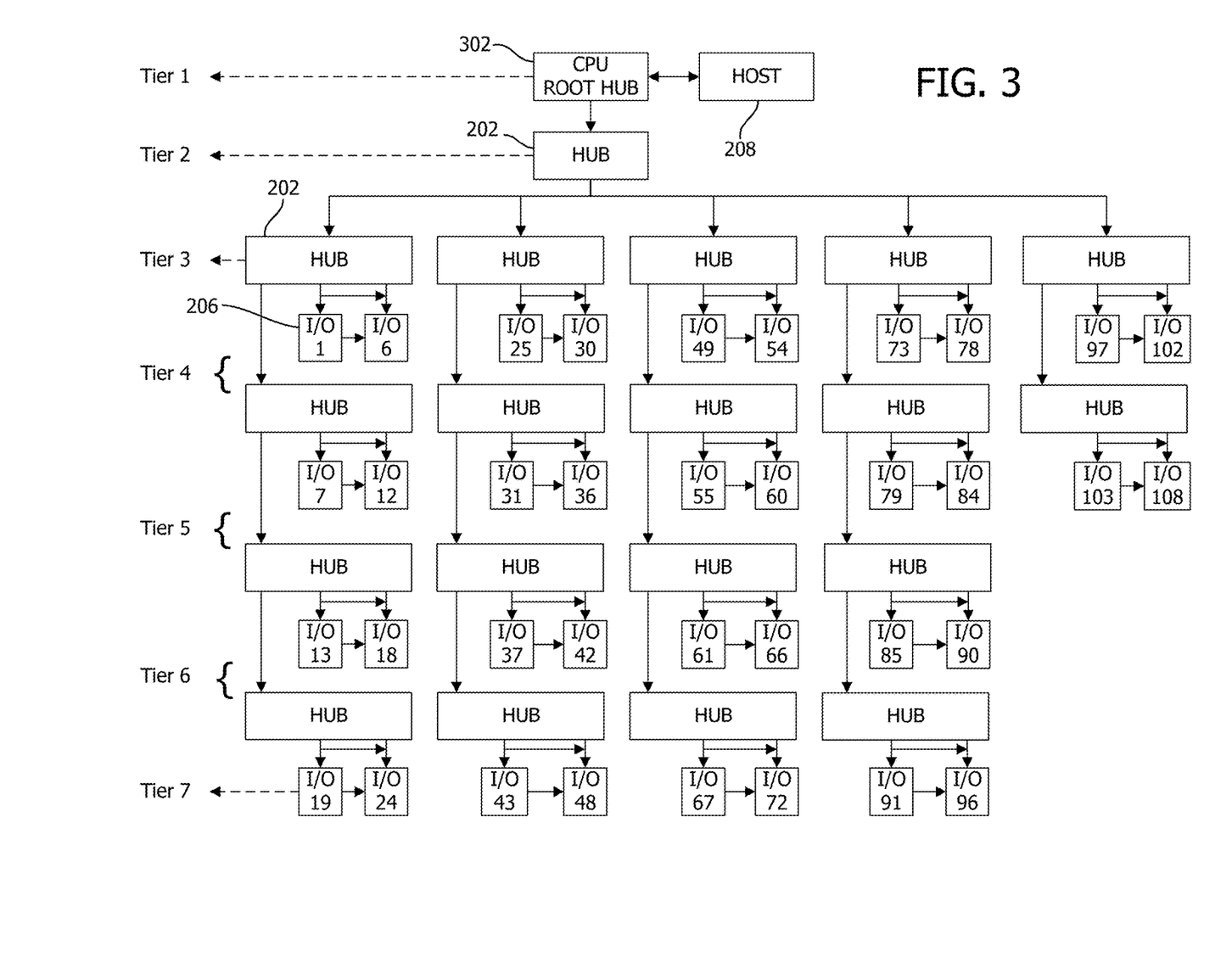
FIG. 3 is a block diagram illustrating a USB-tiered architecture according to an embodiment.

Referring now to FIG. 3, backplane 110 utilizes the USB-tiered architecture, which supports up to seven tiers in the illustrated embodiment and, as described above, provides a facility to connect up to 127 devices to host 208. Expansion from one tier to the next is accomplished using one of the USB hubs 202. In the multi-tier USB architecture of FIG. 3, the devices on the USB bus, namely, I/O modules 206, are physically connected to host 208 via a tiered, star topology using by means of a root hub 302 associated with CPU module 106.

The root hub 302 communicates with host 208 in the same manner as any of the devices (e.g., I/O modules 206) attached to the USB. But the root hub 302 has a special role by providing one or more initial attachment points to host 208. Additional attachment points may be provided by external hubs. In an embodiment, root hub 302 is integrated within the USB host controller 208, and is at the center of the star topology and considered the first tier or root node of the USB tree architecture of FIG. 3. As described above in connection with FIG. 2, each hub 202 has an upstream port 204 connecting to a higher level in the USB topology hierarchy, and numerous (typically 4 or 7) downstream ports 204 for connecting devices such as I/O modules 206 and other hubs 202. FIG. 3 illustrates root hub 302 connected to hub 202, which is part of the second tier. In turn, the hub 202 of the second tier is connected to the next level of USB hubs 202. The third to seventh tiers have a combination of USB hubs 202 and I/O modules (devices) 206. For example, each hub 202 is configured for connection to six I/O modules 206 and one hub 202 in the next tier.

The USB-tiered architecture embodying aspects of the present disclosure supports up to 127 devices, or I/O modules 206 with a single host controller 208. In this embodiment, each USB hub 202 is also treated as a device such that the system architecture of FIG. 3 is capable of supporting 108 I/O modules 206 and 19 hubs 202. The I/O modules 206 can support up to 1728 I/O assuming each I/O module 206 can support 16 I/O channels. In this embodiment, six I/O modules 206 are attached to each hub 202. It is to be understood that hubs 202 having more or fewer downstream ports 204 for connecting I/O modules 206 are within the scope of the present disclosure. The address field in a USB packet specifying which device the packet is designated for is 7 bits long. It allows the address values for USB hubs 202 and I/O modules 206 to be between 1 and 127. Address 0 is reserved for a device which has not yet had its address assigned. For example, upon reset and power-up, a device address is defaulted to zero and programmed by the host during an enumeration process.

Figure 4:
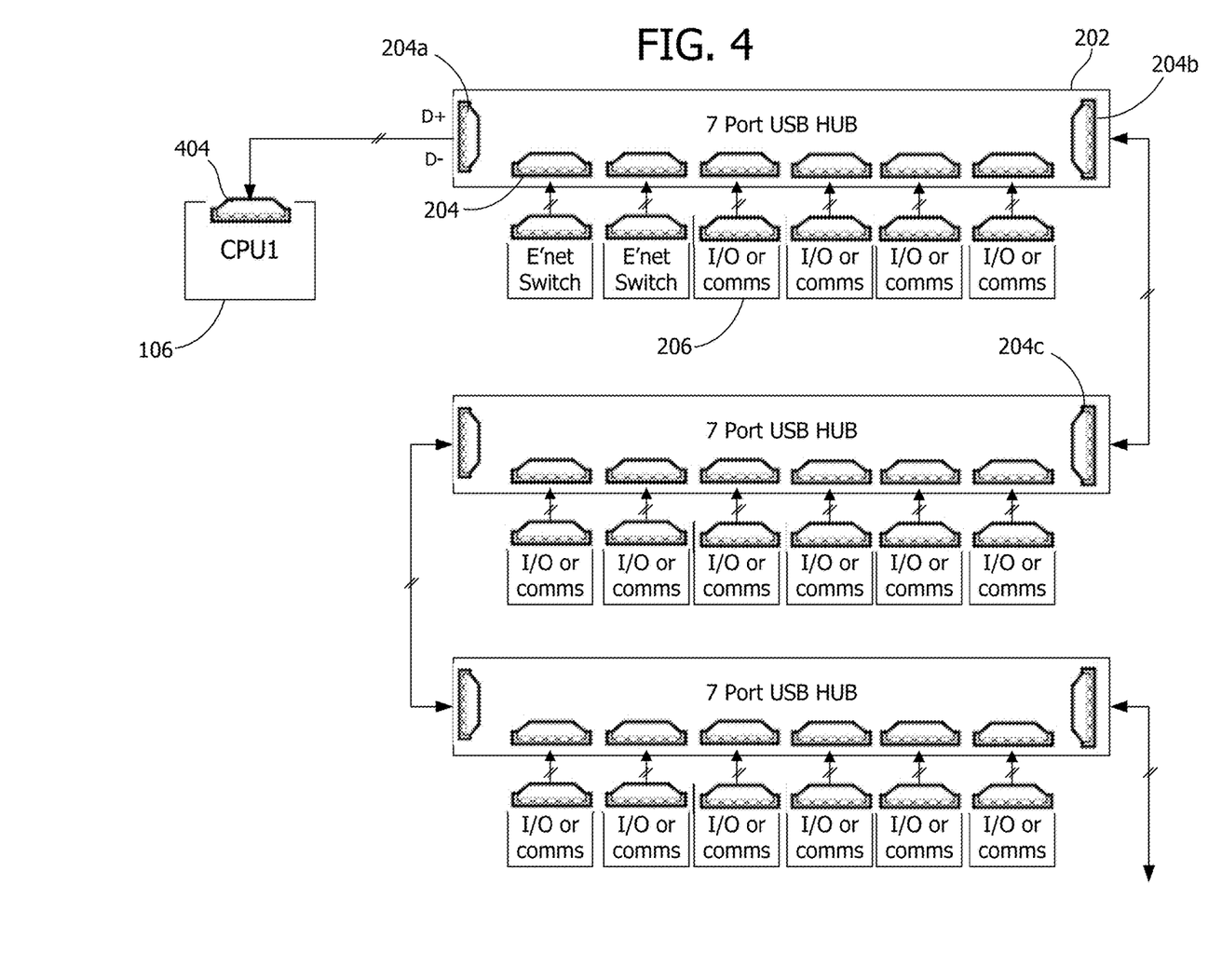
FIG. 4 illustrates a simplex system architecture of the backplane of FIG. 2.

FIG. 4 illustrates a simplex system architecture of backplane 110 with USB. In the illustrated embodiments, a USB host port 404 from the CPU module 106 is connected to an upstream port 204a of the first hub 202. As shown, six downstream ports 204 are available for connection to the corresponding USB device ports on the I/O or communication modules 206. A seventh downstream port, indicated at 204b, of the first hub 202 is used to connect to the upstream port 204c of the second hub 202 and so on. The backplane 110 may include USB connections for one or more other types of interface connections (e.g., Ethernet, EtherCAT, Rapid I/O, PCI Express) in addition to the plurality of USB connections.

Figure 5:
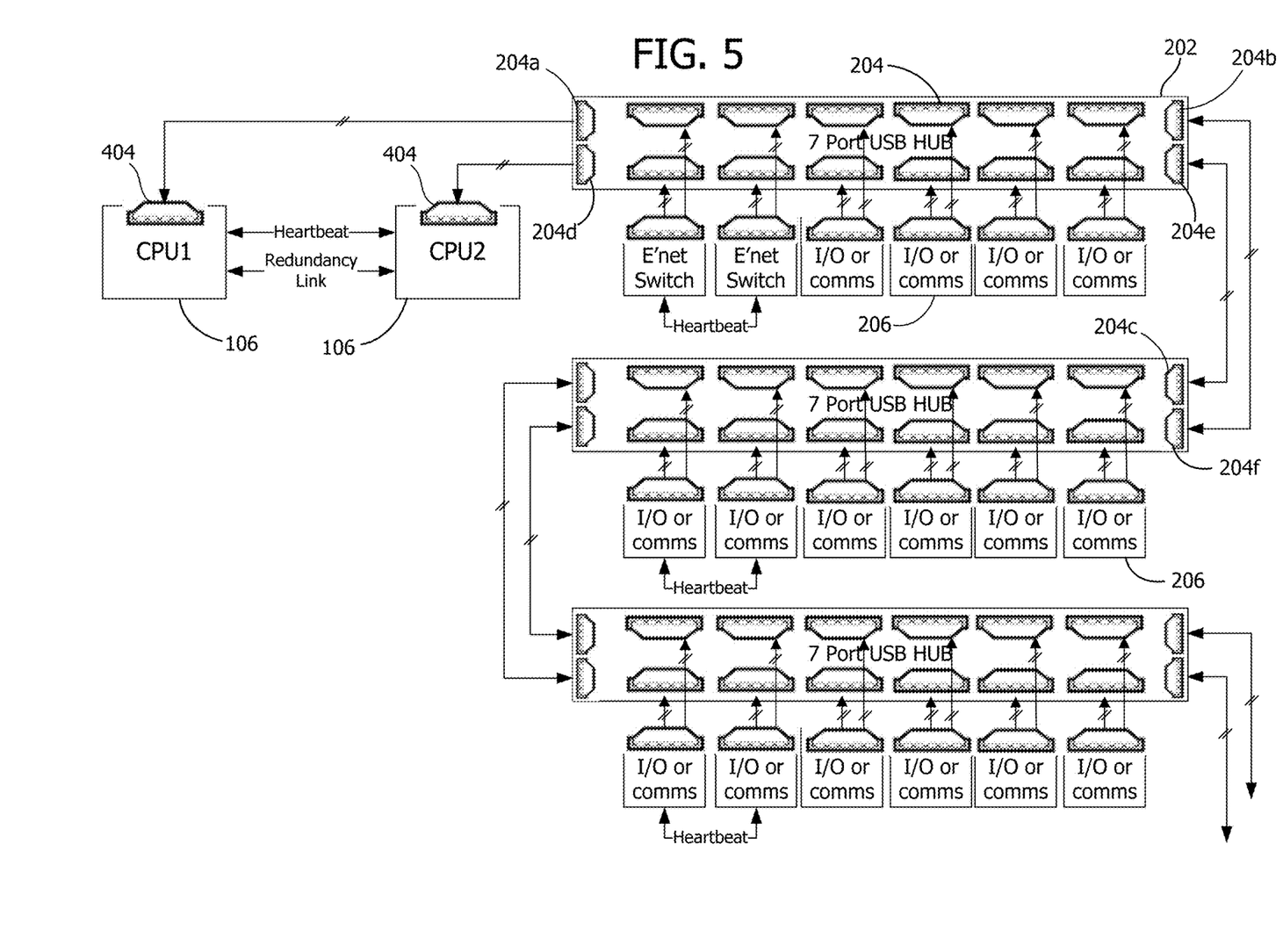
FIG. 5 illustrates a redundant system architecture of the backplane of FIG. 2.

FIG. 5 illustrates a redundant system architecture of backplane 110 with USB similar to the simplex architecture of FIG. 4. In FIG. 5, USB hubs 202 are doubled to permit connecting I/O modules 206 to each of two CPU modules 106. In the illustrated embodiment, the USB host port 404 from the first CPU module 106, labeled CPU1, is connected to an upstream port 204a of the active/primary hub 202. Similarly, the USB host port 404 from the second CPU module 106, labeled CPU2, is connected to an upstream port 204d of the standby/secondary hub 202. The selection of the active or standby hub is managed in between the pair of CPU modules 106. As shown, I/O module or communication modules 206 connect to the downstream ports 204 of the active/primary and standby/secondary hubs 202 by two device ports. A seventh downstream port, indicated at 204b, of the first active/primary hub 202 is used to connect to the upstream port 204c of the second active/primary hub 202 and so on. A seventh downstream port, indicated at 204e, of the first standby/secondary hub 202 is used to connect to the upstream port 204f of the second standby/secondary hub 202 and so on. The backplane 110 may include USB connections for one or more other types of interface connections (e.g., Ethernet, EtherCAT, Rapid I/O, PCI Express) in addition to the plurality of USB connections.

In an embodiment, the CPU module 106 of USB host controller 208 adopts standard defined device classes to identify the connected devices 206 and nominally load the driver. The throughput of the USB data communication depends on the device classes, with there being a total of 23 device classes defined in USB standard and all the of them can be used to communicate with the I/O and/or communication modules 206. The higher throughput of USB 2.0 data communication, for example, is achieved with vendor specific device class and is approximately 184 mbps. The lowest throughput of USB 2.0 data communication is observed with human interface device class and is approximately 3.2 mbps.

A single board computer such as Odroid—C2 (Linux OS) embodies host 208 for use with the USB backplane 110 that provides suitable throughput and scan times. TABLE 1, below, shows example throughput times for a USB device in the Vendor Specific Class—Vendor, namely, Odroid—C2 (Linux OS), for a PIC32MZ device (maximum packet size of 512 bytes), wherein communication is carried out directly with the endpoints and throughput and scan times are high compared to other USB device classes.

TABLE 1

| Bytes Transferred from Host to Device | Bytes Transferred from Device to Host | Throughput (Mbps) Host to Device | Throughput (Mbps) Device to Host |
|---|---|---|---|
| 512 | 512 | 136.5 | 110 |
| 1024 | 1024 | 154.5 | 157.5 |
| 4096 | 4096 | 169.5 | 182 |

TABLE 2, below, shows example scan times for the host of TABLE 1, namely, Odroid—C2 (Linux OS) for two PIC32MZ devices (maximum packet size of 512 bytes).

TABLE 2

| Bytes Transferred from Host to Each Device | Bytes Transferred from Each Device to Host | Scan Time (μsec) | Throughput (Mbps) Approx. Host to Devices | Throughput (Mbps) Approx. Devices to Host |
|---|---|---|---|---|
| 256 | 256 | 230-250 | 52 | 89 |
| 512 | 512 | 230-250 | 95 | 151 |
| 1024 | 1024 | 250-260 | 146 | 178 |
| 256 | 256 | 230-250 | 52 | 85 |
| 512 | 512 | 230-250 | 96 | 141 |
| 1024 | 1024 | 250-260 | 148 | 184 |

TABLE 3, below, shows example measured performance for high-speed USB 2.0. In this TABLE, the bandwidth requirement for backplane 110 to be able to achieve deterministic data updates in the range of 1 millisecond for 1000 field inputs is shown. TABLE 3 provides data for 64 I/O modules 206 where data per module is 512 bytes and the total payload is 32768 bytes or 262144 bits. For this data, each I/O module 206 has the capacity of monitoring or controlling 16 field I/O and each I/O module 206 has 512 bytes of data to be updated.

TABLE 3

| Bandwidth (MBPS) | Throughput (%) | Real Bandwidth (MBPS) | Scan Time for I/O (Milliseconds) |
|---|---|---|---|
| 25 | 50 | 12.5 | 20 |
| 50 | 50 | 25 | 10 |
| 100 | 50 | 50 | 5.0 |
| 200 | 50 | 100 | 2.5 |
| 300 | 50 | 150 | 1.67 |
| 400 | 50 | 200 | 1.25 |
| 500 | 50 | 250 | 1 |
| 1000 | 50 | 500 | 0.5 |

TABLE 4, below, shows additional example measured performance data for high-speed USB 2.0.

TABLE 4

| No. of I/O Modules (Data Payload 512 B) | No. of Comm Modules (Payload 2 KB) | Scan Time (Approx) (Milliseconds) |
|---|---|---|
| 86 | 10 | 6.8 |
| 50 | 46 | 14 |
| — | 96 | 24 |

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/ or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A high-speed scalable backplane system for enabling communications in an industrial system between a pair of redundant central processing unit (CPU) modules and a plurality of industrial system modules, the industrial system modules comprising field input/output (I/O) and/or communication modules, the high-speed scalable backplane comprising:
    a root hub associated with the CPU module, the root hub having a host port and defining a first tier of a tiered architecture; and
    a plurality of Universal Serial Bus (USB) hubs sequentially coupled to each other and arranged according to the tiered architecture, each of the USB hubs having an upstream port and a plurality of downstream ports, wherein the plurality of USB hubs comprises:
        a pair of top USB hubs defining a second tier of the tiered architecture, wherein one of the top USB hubs comprises an active hub and another one of the top USB hubs comprises a standby hub, the top USB hubs each having an upstream port thereof coupled to the host port of the root hub and connected to one of the CPU modules via a host coupled to the host port; and
        one or more pairs of lower USB hubs each defining a successive tier of the tiered architecture, the lower USB hubs each having an upstream port thereof coupled to a selected downstream port of one of the USB hubs in an immediately preceding tier of the tiered architecture, wherein each of the industrial system modules has a unique address value specified in a USB packet such that the lower USB hubs are each configured to enable a plurality of I/O and/or communications connections for the industrial system modules via a plurality of downstream ports thereof, and wherein the connections are scalable as a function of a number of the industrial system modules using the high-speed scalable backplane in the industrial system.

2. The high-speed scalable backplane of claim 1, wherein each of one pair of lower USB hubs has an upstream port thereof coupled to a selected downstream port of one of the top USB hubs to define a third tier of the tiered architecture.

3. The high-speed scalable backplane of claim 1, wherein the communications modules of the industrial system modules comprise at least one type of interface connection selected from a group consisting of: Ethernet; EtherCAT; Rapid I/O; and PCI Express.

4. The high-speed scalable backplane of claim 1, wherein the plurality of connections enabled by the lower USB hubs are configured for one or more USB-C connections.

5. The high-speed scalable backplane of claim 1, wherein the high-speed scalable backplane manages communications between the CPU modules and the industrial system modules over the plurality of connections enabled by the lower USB hubs.

6. The high-speed scalable backplane of claim 1, wherein the tiered architecture comprises a tiered star topology supporting up to seven tiers.

7. The high-speed scalable backplane of claim 6, wherein the root hub associated with the CPU modules comprises a center of the star topology.

8. The high-speed scalable backplane of claim 6, wherein the lower USB hubs define third to seventh tiers of the tiered architecture.

9. The high-speed scalable backplane of claim 6, wherein the plurality of I/O and/or communications connections enabled by the lower USB hubs supports up to 127 devices, the 127 devices including 108 modules and 19 USB hubs in accordance with the tiered architecture.

10. The high-speed scalable backplane of claim 9, wherein the devices each have a 7-bit unique address value from 1 to 127.

11. The high-speed scalable backplane of claim 10, wherein the address value of 0 is reserved for a device that has not yet had an address assigned thereto.

12. The high-speed scalable backplane of claim 1, wherein the plurality of downstream ports of the lower USB hubs includes the selected downstream port coupled to the upstream port of one of the USB hubs in a next successive tier of the tiered architecture and up to six downstream ports configured for connection to the industrial system modules.

13. A method of enabling high-speed scalable communications in an industrial system between a pair of redundant central processing unit (CPU) modules and a plurality of industrial system modules, the CPU modules having a root hub associated therewith, the industrial system modules comprising field input/output (I/O) and/or communication modules, the method comprising:
    installing a plurality of Universal Serial Bus (USB) hubs in a backplane structure, the plurality of USB hubs including a pair of top USB hubs and one or more pairs of lower USB hubs, wherein one of the top USB hubs comprises an active hub and another one of the top USB hubs comprises a standby hub;
    coupling an upstream port of each top USB hub to a corresponding host port of the root hub associated with the CPU modules, the root hub defining a first tier of a tiered architecture and the top USB hub defining a second tier of the tiered architecture, wherein the top USB hubs are connected to the CPU modules via a host coupled to the host port; and
    coupling an upstream port of each of the lower USB hubs to a selected downstream port of one of the USB hubs in an immediately preceding tier of the tiered architecture, wherein each of the modules has a unique address value specified in a USB packet such that the lower USB hubs are each configured to enable a plurality of I/O and/or communications connections for the industrial system modules via a plurality of downstream ports thereof, and wherein the connections are scalable as a function of a number of the industrial system modules using the high-speed scalable backplane in the industrial system.

14. The method of claim 13, wherein coupling the upstream port of each of the lower USB hubs comprising coupling the upstream port of each of one pair of lower USB hubs to a selected downstream port of one of the top USB hubs to define a third tier of the tiered architecture.

15. The method of claim 13, further comprising managing communications between the CPU modules and the industrial system modules over the plurality of connections enabled by the lower USB hubs.

16. The method of claim 13, wherein the tiered architecture comprises a tiered star topology supporting up to seven tiers and wherein the root hub associated with the CPU modules comprises a center of the star topology, and further comprising defining third to seventh tiers of the tiered architecture by the lower USB hubs.

17. The method of claim 16, wherein the plurality of I/O and/or communications connections enabled by the lower USB hubs supports up to 127 devices, the 127 devices including 108 modules and 19 USB hubs in accordance with the tiered architecture.

18. The method of claim 16, further comprising assigning each of the devices with a 7-bit unique address value from 1 to 127.

19. The method of claim 18, further comprising reserving the address value of 0 for a device that has not yet had an address assigned thereto.

20. The method of claim 13, wherein the plurality of downstream ports of the lower USB hubs includes the selected downstream port coupled to the upstream port of one of the USB hubs in a next successive tier of the tiered architecture and up to six downstream ports configured for connection to the industrial system modules.

21. The high-speed scalable backplane of claim 1, wherein the address value upon reset of a module is defaulted to 0 and programmed by a host coupled to the host port during an enumeration process.

22. The method of claim 13, further comprising defaulting the address value upon reset of a module to 0 and performing, by a host coupled to the host port, an enumeration process to program the defaulted address value.

* * * * *